(12) United States Patent
Cleland et al.

(10) Patent No.: US 6,273,656 B1
(45) Date of Patent: Aug. 14, 2001

(54) PUSH PIN FASTENER

(75) Inventors: Scott Cleland, Rochester; Christopher L Riddle, Westland, both of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/568,597

(22) Filed: May 10, 2000

(51) Int. Cl.⁷ ...................................................... F16B 13/06
(52) U.S. Cl. .............................. 411/45; 411/60.1; 411/72
(58) Field of Search .................................. 411/41, 45, 46, 411/48, 57.1, 60.1, 72

(56) References Cited

U.S. PATENT DOCUMENTS

| | | | |
|---|---|---|---|
| 4,753,561 | 6/1988 | Betterton et al. | 411/182 |
| 4,840,523 | * 6/1989 | Oshida | 411/48 |
| 4,871,289 | * 10/1989 | Choiniere | 411/41 X |
| 5,114,203 | 5/1992 | Carnes | 296/50 |
| 5,339,491 | 8/1994 | Sims | 16/2 |
| 5,387,065 | * 2/1995 | Sullivan | 411/45 X |
| 5,445,436 | 8/1995 | Kemnitz | 297/452.63 |
| 5,540,528 | * 7/1996 | Schmidt et al. | 411/41 X |
| 5,704,746 | * 1/1998 | Leib et al. | 411/41 X |
| 5,820,214 | 10/1998 | Bessette et al. | 297/228.13 |
| 5,921,510 | 7/1999 | Benoit et al. | 248/71 |
| 5,929,382 | 7/1999 | Moore et al. | 174/72 TR |

* cited by examiner

*Primary Examiner*—Neill Wilson
(74) *Attorney, Agent, or Firm*—Mark P. Calcaterra

(57) ABSTRACT

A fastener includes an upper retaining portion, a body and a pin. The upper retaining portion has an aperture. The body has first and second side portions. The first and second side portions have first and second ends. The first ends of the first and second side portions are coupled to a surface of the upper retaining portion on opposite sides of the aperture and extending in a direction away from the surface of the upper retaining portion. The first and second side portions having a plurality of branch portions coupled to an outer surface of the respective first and second side portions. The pin has a top and an insertion portion. The insertion portion is adapted to be inserted through the aperture of the upper retaining portion, thereby expanding the body in outward directions.

14 Claims, 3 Drawing Sheets

PUSH PIN FASTENER

BACKGROUND OF THE INVENTION

1. Field of the Invention

The present invention generally relates to fasteners. More particularly, the present invention relates to a push pin fastener having an expandable body portion.

2. Discussion

Rivet fasteners exist in many shapes and sizes as is well known in the art. Rivets are typically used to join two or more objects by providing two retaining ends connected by a shaft which provides a clamp load connecting the respective objects. Rivets generally do not provide a significant amount of axial retention. Rather the retention ability of a rivet is supplied from the clamp force generated by the rivet ends.

A Christmas tree type fastener is also well known in the art. A Christmas tree fastener provides a series of fins capable of different levels of axial retention and grip abilities. The fins of a Christmas tree type fastener typically flex inward during application and retract outward once inserted, thereby creating an axial force which holds the respective members together. The amount of axial force a Christmas tree type fastener provides is predetermined by the fin characteristics. Once a Christmas tree type fastener is fully inserted, the fins cannot be influenced to increase the axial force and gripping ability.

SUMMARY OF THE INVENTION

It is an advantage of the present invention to provide a fastener which combines the clamp load abilities of a blind rivet with the retention grip range of a Christmas tree type fastener.

It is another advantage of the present invention to provide a fastener having a body portion containing a series of annular fins and a pin portion to be inserted through an aperture of the body portion thereby extending the fins and providing increased retention.

It is yet another advantage of the present invention to provide a fastener simple in structure, inexpensive to manufacture and durable to use.

In one form, the present invention provides a fastener including an upper retaining portion, a body and a pin. The upper retaining portion has an aperture. The body has first and second side portions. The first and second side portions have first and second ends. The first ends of the first and second side portions are coupled to a surface of the upper retaining portion on opposite sides of the aperture and extending in a direction away from the surface of the upper retaining portion. The first and second side portions having a plurality of branch portions coupled to an outer surface of the respective first and second side portions. The pin has a top and an insertion portion. The insertion portion is adapted to be inserted through the aperture of the upper retaining portion, thereby expanding the body in outward directions.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
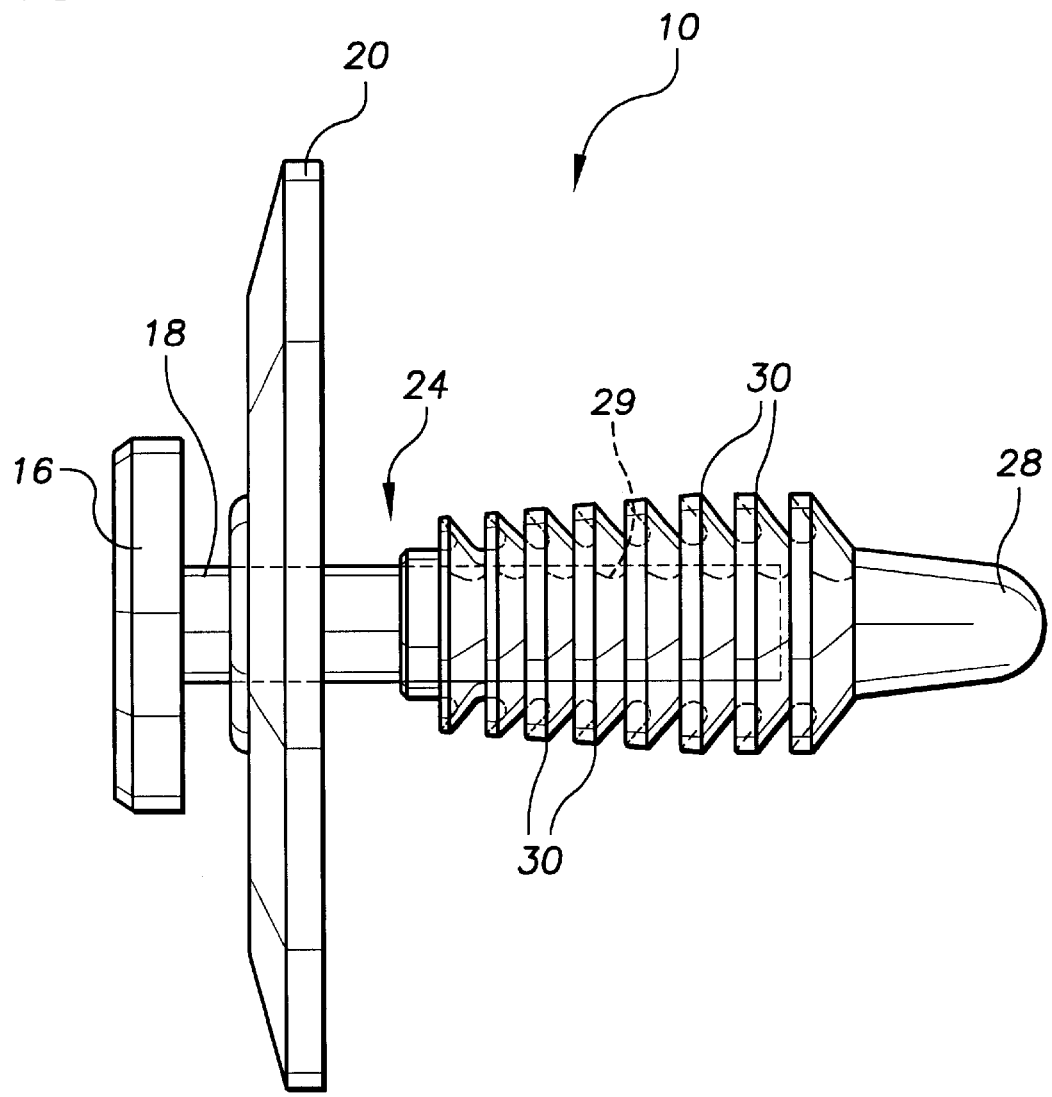
FIG. 1 is a side view of a fastener constructed in accordance with the teachings of a preferred embodiment of the present invention.
Figure 2:
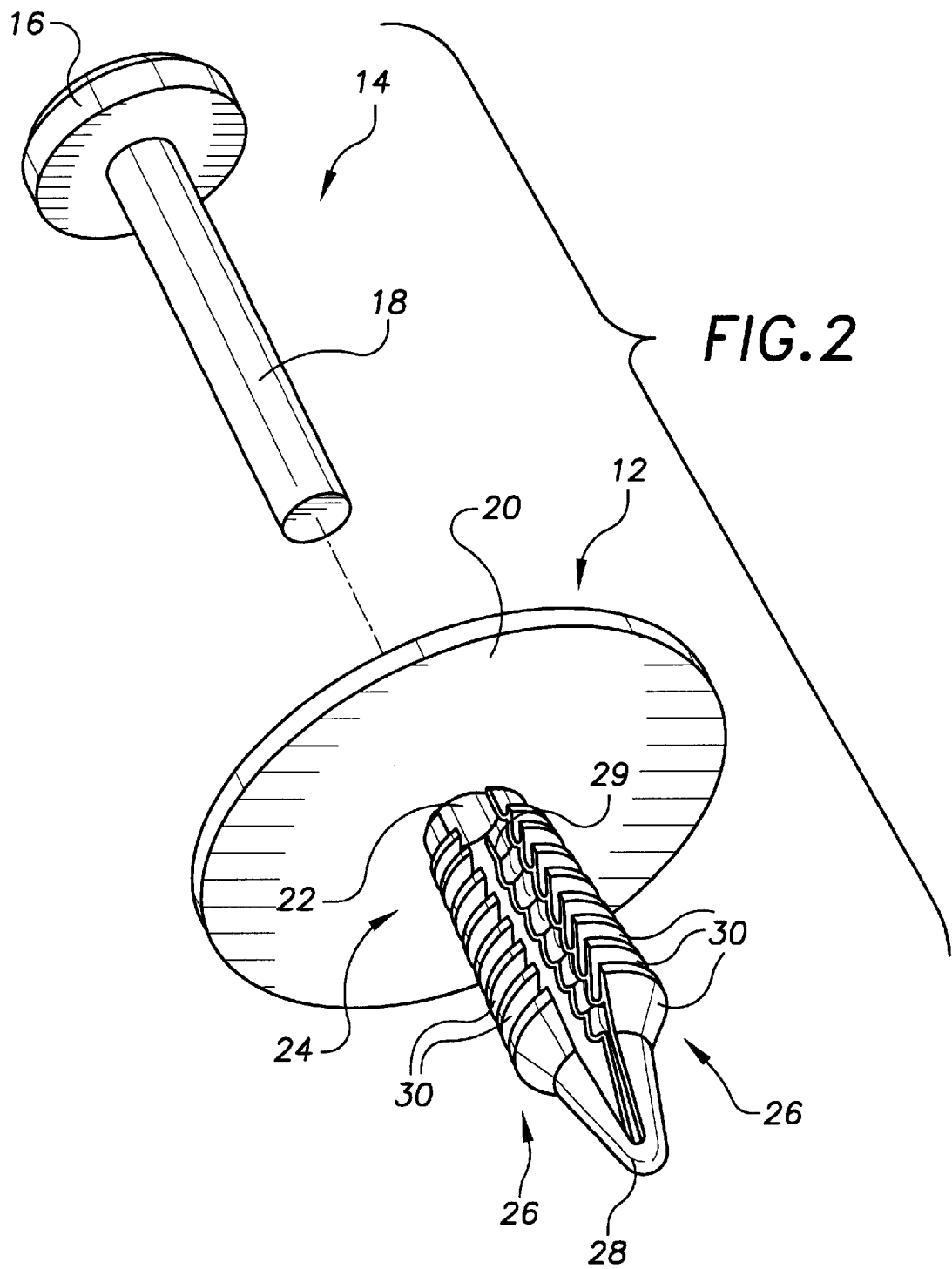
FIG. 2 is a perspective view of the fastener of the present invention shown partially exploded.

With general reference to FIGS. 1 through 4, a fastener constructed in accordance with the teachings with the present invention is shown and generally identified at reference number 10. The fastener is generally shown to include a base member 12 and a pin member 14. In the exemplary embodiment, the base member 12 and the pin member 14 are both constructed of plastic. However, it will be appreciated by those skilled in the art that alternative materials may be employed for either if the components. For example, in certain applications it may be desirable to construct the pin member from steel or other metal.

The pin member 14 is illustrated to include a top portion or head 16. The pin member 14 also includes an insertion portion or shank 18. The shank 18 is formed with and extends from the top portion 16.

The base member 12 includes an upper retaining portion or flange portion 20. The upper retaining portion 20 is generally cylindrical in shape and defines a centrally located aperture 22. The base member 12 further includes a main body 24 which extends from the upper retaining portion 20 in a direction generally perpendicular to a plane defined by the upper retaining portion 20. The main body portion 24 includes a plurality of side portions or arms 26 radially disposed about an axis extending through the aperture 22. Each of the arms 26 are joined to one another at a distal tip or end 28. Explaining further, the arms 26 cooperate to form the distal tip 28 which is generally conical in shape.

In the particular embodiment illustrated, the main body portion 24 is shown to include two arms 26. However, it will become apparent to those skilled in the art that the main body portion 24 may alternatively include three or more arms 26 of similar construction. The plurality of arms 26 cooperate to define a channel 29.

Along a substantial portion of their respective lengths, the arms 26 are formed to include branch portions or annular fins 30. The annular fins 30 function to provide retention at varying grip ranges for multiple part thickness variations. The effective diameter defined by the annular fins 30 of the arms 26 tapers toward the upper retaining portion 20. In addition, the thickness of the annular fins 30 is decreased near the upper retaining portion 20 to allow for expansion of the base member 12.

Figure 3:
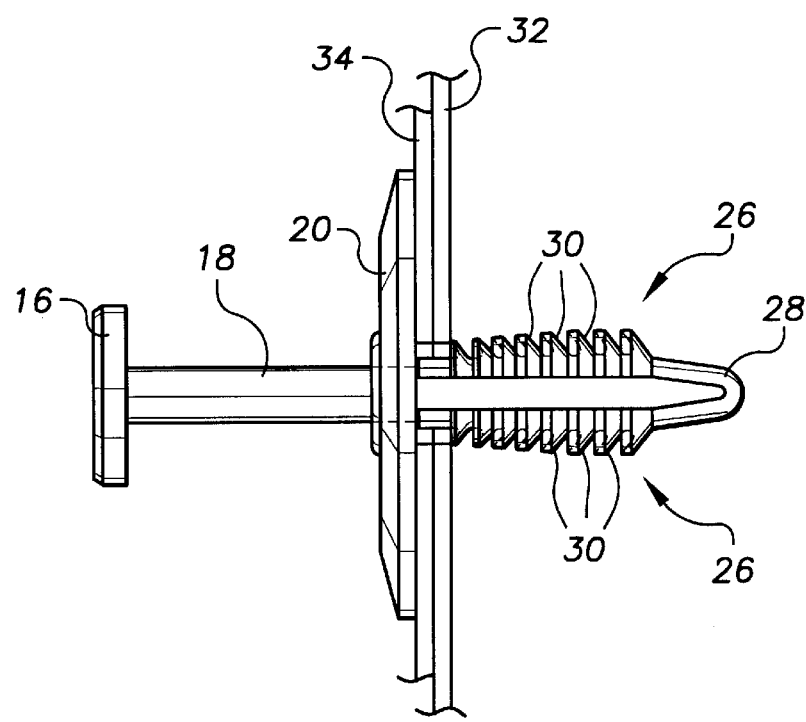
FIG. 3 is a side view of the fastener of the present invention shown operatively associated with first and second members to be secured to one another, the pin of the fastener illustrated prior to insertion into an aperture defined by a body of the fastener.
Figure 4:
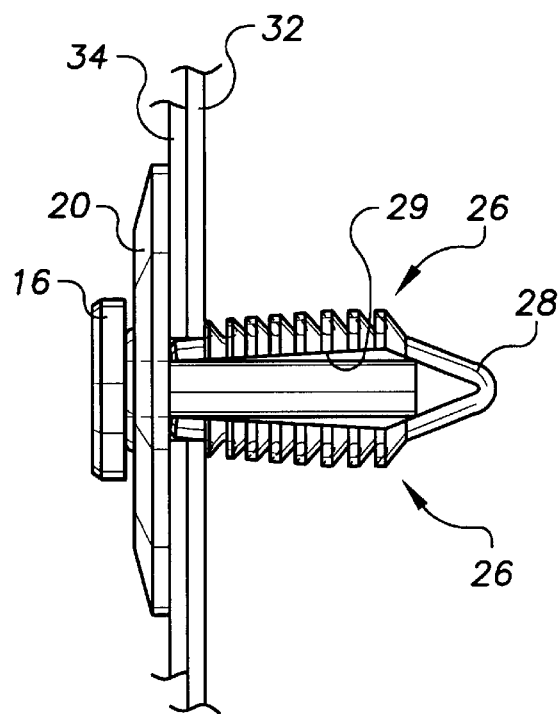
FIG. 4 is a side view similar to FIG. 3, illustrated with the pin inserted into the aperture of the body.

In use, the base member 12 is first inserted into holes located in first and second members 32 and 34 to be joined. The pin member 14 is next inserted through the aperture 22 and into the channel 29 defined by the arms 26. Advancement of the pin member 14 operates to radially expand the arms 26. FIG. 3 illustrates the pin member 14 and the base member 12 prior to insertion. FIG. 4 shows the pin member 14 fully inserted through the aperture 22 and into the channel with the arms 26 outwardly expanded.

In the embodiment illustrated, the shank 18 of the pin member 14 is smooth. As such, the shank 18 is linearly advanced into the channel 29. The channel 29 tapers so as to force the arms 26 radially outward upon shank 18 advancement. Alternatively, the shank 18 may be formed to include a plurality of external threads for engaging internal threaded segments carried by the arms 26.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A fastener comprising:

an upper retaining portion having an aperture;

a body having first and second side portions, the first and second side portions having first and second ends, the first ends of the first and second side portions being coupled to a surface of the upper retaining portion on opposite sides of the aperture and extending in a direction away from the surface of the upper retaining portion, the first and second side portions having a plurality of branch portions coupled to an outer surface of the respective first and second side portions; and a pin having a top and an insertion portion, the insertion portion having a uniform cross section along its length and adapted to be inserted through the aperture of the upper retaining portion, thereby expanding the body in outward directions.

2. The fastener of claim 1 wherein the ends of said first and second side portions opposite said retaining portion cooperate to form a conical end portion.

3. The fastener of claim 2 wherein said branch portions taper outward toward said upper retaining portion.

4. The fastener of claim 3 wherein a thickness of said branch portions is reduced near said upper retaining portion.

5. The fastener of claim 1 wherein said insert portion of said pin is linearly advanced through the aperture.

6. A fastener comprising:

a pin having a shank, the shank having a uniform cross section along its length; and a base portion including an upper retaining portion defining an aperture, the base portion further including a plurality of arms extending in a direction substantially parallel to an axis passing through the aperture, the plurality of arms each including a plurality of radially extending ribs and defining a channel for receiving the shank of the pin, the channel being aligned with the aperture, the plurality of arms configured to outwardly expand upon introduction of the shank through the aperture and into the channel.

7. The fastener of claim 6 wherein the plurality of arms includes first and second arms.

8. The fastener of claim 6 wherein the plurality of arms are joined to form a tip.

9. The fastener of claim 8 wherein the tip has a generally conical shape.

10. The fastener of claim 6, wherein said insert portion is linearly advanced through the aperture.

11. A fastener comprising:

an upper retaining portion having an aperture;

a body having first and second side portions, the first and second side portions having first and second ends, the first ends of the first and second side portions being coupled to a surface of the upper retaining portion on opposite sides of the aperture and extending in a direction away from the surface of the upper retaining portion, the first and second side portions having a plurality of branch portions coupled to an outer surface of the respective first and second side portions, the branch portions having a reduced thickness near the upper retaining portion; and a pin having a top and an insertion portion, the insertion portion being adapted to be inserted through the aperture of the upper retaining portion, thereby expanding the body in outward directions.

12. The fastener of claim 11 wherein the ends of said first and second side portions opposite said retaining portion cooperate to form a conical end portion.

13. The fastener of claim 12 wherein said branch portions taper outward toward said upper retaining portion.

14. The fastener of claim 11 wherein said insert portion of said pin is linearly advanced through the aperture.

\* \* \* \* \*